US012682198B2

(12) United States Patent
Hammersberg et al.

(10) Patent No.: US 12,682,198 B2
(45) Date of Patent: Jul. 14, 2026

(54) ENROLMENT ASSISTANCE DEVICE

(71) Applicant: FINGERPRINT CARDS ANACATUM IP AB, Gothenburg (SE)

(72) Inventors: Johan Hammersberg, Floda (SE); Erik Naeslund, Floda (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/992,421

(22) PCT Filed: Jul. 4, 2023

(86) PCT No.: PCT/SE2023/050698
§ 371 (c)(1),
(2) Date: Jan. 8, 2025

(87) PCT Pub. No.: WO2024/015003
PCT Pub. Date: Jan. 18, 2024

(65) Prior Publication Data
US 2026/0010751 A1      Jan. 8, 2026

(30) Foreign Application Priority Data
Jul. 13, 2022      (SE) .................................... 2250901-2

(51) Int. Cl.
*G06K 19/07*          (2006.01)
*H02J 50/00*          (2016.01)
(Continued)

(52) U.S. Cl.
CPC ..... *G06K 19/0718* (2013.01); *G06K 19/0707* (2013.01); *H02J 50/001* (2020.01);
(Continued)

(58) Field of Classification Search
None
See application file for complete search history.

(56) References Cited

U.S. PATENT DOCUMENTS 10,033,437  B1      7/2018  Bimbaud et al.
2005/0240778  A1    10/2005  Saito
(Continued)

FOREIGN PATENT DOCUMENTS

EP          4068570 A1    10/2022
EP          4113361 A1 *  1/2023   ......... G06K 7/10178
(Continued)

OTHER PUBLICATIONS

PCT International Search Report and Written Opinion dated Sep. 15, 2023 for International Application No. PCT/SE2023/050698, 14 pages.

*Primary Examiner* — Kristy A Haupt
(74) *Attorney, Agent, or Firm* — RMCK Law Group, PLC

(57)          ABSTRACT

An enrolment assistance device comprises a carrier having a first surface portion for receiving a user device with a wireless power transfer arrangement, and a second surface portion spaced apart from the first surface portion to receive a smartcard. The first surface portion has a conductor configured to wirelessly harvest energy from the wireless power transfer arrangement. The second surface portion has a conductor arranged to be connected to the conductor of the first surface portion via a connector for wirelessly transfer the harvested energy to a wireless power transfer arrangement of the smartcard. The smartcard transmits a signal to the user device when moved into a position that enables the smartcard to harvest an amount of energy exceeding an energy threshold via the conductor of the second surface portion, the signal causing the user device to provide an alert to the user that a desired position has been reached.

15 Claims, 7 Drawing Sheets

(51) Int. Cl.

| | | |
|---|---|---|
| *H02J 50/05* | (2016.01) | |
| *H02J 50/10* | (2016.01) | |
| *H02J 50/90* | (2016.01) | |

(52) U.S. Cl.
CPC ............... *H02J 50/90* (2016.02); *H02J 50/05* (2016.02); *H02J 50/10* (2016.02)

(56) References Cited

U.S. PATENT DOCUMENTS

| | | |
|---|---|---|
| 2017/0170678 A1 | 6/2017 | Uhm |
| 2018/0294845 A1 | 10/2018 | Bimbaud et al. |
| 2020/0327533 A1 | 10/2020 | Deprun et al. |

FOREIGN PATENT DOCUMENTS

| | | | |
|---|---|---|---|
| WO | 2018151647 A1 | 8/2018 | |
| WO | WO-2023274673 A1 * | 1/2023 | ......... G06K 7/10178 |

* cited by examiner

ENROLMENT ASSISTANCE DEVICE

CROSS-REFERENCE TO RELATED APPLICATIONS

This application is a 371 U.S. National Stage of International Application No. PCT/SE2023/050698, filed Jul. 4, 2023, which claims priority to Swedish Patent Application No. 2250901-2, filed Jul. 13, 2022. The disclosures of each of the above applications are incorporated herein by reference in their entirety.

TECHNICAL FIELD

The present disclosure relates to an enrolment assistance device configured to facilitate biometric enrolment of a user of a contactless smartcard, and a method performed by the device.

BACKGROUND

Biometric arrangements are widely used as means for increasing convenience and security of personal electronic devices, such as mobile phones and tablets. Fingerprint sensing arrangements, in particular, are now included in many personal electronic devices.

Lately, efforts have also been made to introduce biometric arrangements, such as fingerprint sensing arrangements in other devices that may have less computing power and/or available energy. Examples of such other devices are so-called smartcards, door locks, and Internet-of-things (IoT) devices, etc.

It is, however, challenging to provide for secure, reliable, and convenient biometric enrolment (i.e. the process of initial registering of biometric data at a device for subsequent authentication) of a user of such biometric arrangements. For instance, it may be desirable to guide the user during the enrolment, which is complicated by the fact that some devices with biometric arrangements may lack a user interface, or may have only rudimentary means for interacting with the user. For example, a biometrically enabled smartcard is typically not equipped with a user interface.

US 2020/0327533 discloses powering, and communicating with, a smartcard during enrolment utilizing the user's mobile device. To aid the user in correctly positioning the smartcard in relation to the mobile device, US 2020/0327533 proposes that a visual marker is displayed on the screen of the mobile device in order to guide the user to position the smartcard on the backside of the mobile device during the enrolment procedure.

It appears to be potentially cumbersome for the user to position and press the smartcard against the backside of the mobile device while attempting to enroll one or more fingers, while at the same time following instructions and guidance provided on the display on the frontside of the mobile device.

It would therefore be desirable to provide for more user-friendly enrolment in a biometrically enabled contactless smartcard.

SUMMARY

One objective is to solve, or at least mitigate, this problem in the art and to provide an enrolment assistance device configured to facilitate biometric enrolment of a user of a contactless smartcard.

This objective is arranged in a first aspect by an enrolment assistance device configured to facilitate biometric enrolment of a user of a contactless smartcard comprising a biometric sensor and a wireless power transfer arrangement. The enrolment assistance device comprises a carrier comprising a first surface portion configured to receive a user device equipped with a wireless power transfer arrangement, and a second surface portion spaced apart from the first surface portion and configured to receive the contactless smartcard. The first surface portion is arranged with a conductor configured to wirelessly harvest energy from the wireless power transfer arrangement of the user device and the second surface portion is arranged with a conductor arranged to be connected to the conductor of the first surface portion via a connector and configured to wirelessly transfer the harvested energy to the wireless power transfer arrangement of the contactless smartcard. Moreover, the contactless smartcard is configured to transmit a signal to the user device upon the user device being moved into position by a user in the first surface portion enabling the contactless smartcard to harvest an amount of energy exceeding an energy threshold via the conductor of the second surface portion, the signal causing the user device to provide an alert to the user that a desired position of the user device has been reached.

This objective is arranged in a second aspect by a method of an enrolment assistance device of facilitating biometric enrolment of a user of a contactless smartcard comprising a biometric sensor and a wireless power transfer arrangement. The enrolment assistance device comprises a carrier comprising a first surface portion configured to receive a user device equipped with a wireless power transfer arrangement and a second surface portion spaced apart from the first surface portion and configured to receive the contactless smartcard. The first surface portion is arranged with a conductor configured to wirelessly harvest energy from the wireless power transfer arrangement of the user device and the second surface portion is arranged with a conductor arranged to be connected to the conductor of the first surface portion via a connector and configured to wirelessly transfer the harvested energy to the wireless power transfer arrangement of the contactless smartcard. Moreover, the contactless smartcard is configured to transmit a signal to the user device upon the user device being moved into position by a user in the first surface portion enabling the contactless smartcard to harvest an amount of energy exceeding an energy threshold via the conductor of the second surface portion, the signal causing the user device to provide an alert to the user that a desired position of the user device has been reached.

Thus, even if a user device is perfectly aligned with the first surface portion of the carrier, it may happen that the wireless power transfer arrangement of the user device is not well-aligned with the conductor of the first surface portion, since the placement of the wireless power transfer arrangement inside the user device may vary depending on brand and/or model of the user device.

As a result, even if the user device is perfectly aligned with the first surface portion of the carrier, it may be that due to the placement of the wireless power transfer arrangement inside the user device, the coupling between the arrangement and the conductor is poor and the amount of harvested energy will not be sufficient for powering the smartcard, and thus not sufficient for the user to enroll her fingerprint with the user device.

This is resolved in that the smartcard is configured to signal to the user device when the harvested energy provided to the smartcard exceeds an energy threshold indicating that the amount of harvested energy is sufficient to power the smartcard.

Hence, as the user moves the user device into a desired position in the first surface portion, once the harvested energy of the conductor of the first surface portion being transferred via the connector to the conductor of the second surface portion and further on to the smartcard exceeds the energy threshold as assessed by the smartcard, a signal is sent to the user device.

The user device will in response to the received signal provide an alert to the user that a desired position of the user device in the first surface portion has been arrived at. The user will thus advantageously leave the user device at that position and enroll her fingerprint with the fingerprint sensor module of the smartcard.

In an embodiment, the carrier is provided in the form of a sheet.

In an embodiment, the carrier comprises at least one indicium for guiding the user to correctly arrange the user device on the first surface portion of the carrier, in relation to the wireless power transfer arrangement of the user device, in order to enable the contactless smartcard to harvest an amount of energy exceeding the energy threshold.

In an embodiment, the conductor of the first surface portion is arranged to extend over a majority of a width of the first surface portion.

In an embodiment, the conductor of the first surface portion is arranged to extend over a majority of a length of the first surface portion.

In an embodiment, the contactless smartcard is arranged to be detachably attached to the second surface portion of the carrier of the enrollment assistance device.

In an embodiment, the signal causes the user device to provide a visual or audial alert to the user that a desired position of the user device has been reached.

In an embodiment, the signal causing the user device to provide an alert to the user that a desired position of the user device has been reached further causing the user device to inform the user that enrolment of biometric data may be performed via the biometric sensor.

In an embodiment, the biometric sensor comprises a fingerprint sensor.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments are shown.

These aspects may, however, be embodied in many different forms and should not be construed as limiting; rather, these embodiments are provided by way of example so that this disclosure will be thorough and complete, and to fully convey the scope of all aspects to those skilled in the art. Like numbers refer to like elements throughout the description.

Figure 1A:
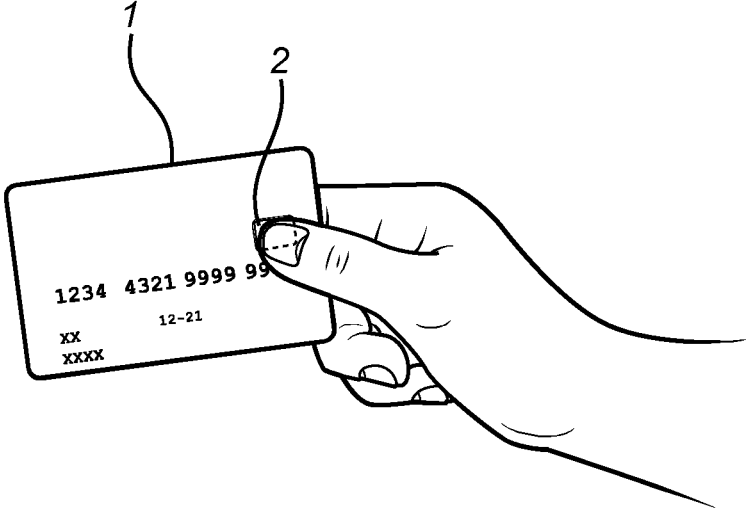
FIG. 1a illustrates a contactless smartcard comprising a fingerprint sensor module.

FIG. 1a illustrates a contactless smartcard 1 comprising a biometric arrangement 2, here in the form of a fingerprint sensor module. The contactless smartcard 1 may e.g. be a biometrically enabled payment card where payments are authorized by biometrically authenticating the user. Examples of other types of biometrically enabled contactless smartcards may include access cards, storage cards, identity cards, etc.

Figure 1B:
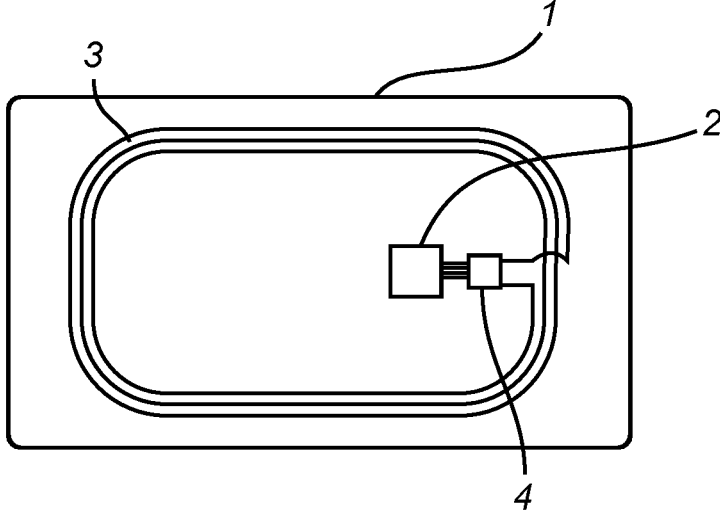
FIG. 1b illustrates an interior of the contactless smartcard.

As illustrated in FIG. 1b, the smartcard 1 additionally comprises a wireless power transfer arrangement 3 and in this particular example a secure element 4. The wireless power transfer arrangement 3 may be used for harvesting electrical power from a time-varying electrical field in order to power the fingerprint sensor module 2, and for wirelessly communicating with a remote device, such as a card reader (not shown), typically through load modulation. The secure element 4 may for instance contain information for authorizing a transaction and is connected to the fingerprint sensor module 2. When the user is authenticated by the fingerprint sensor module 2, the information contained in the secure element 4 may be unlocked and allowed to be wirelessly communicated to the remote device via the wireless power transfer arrangement 3.

Figure 2A:
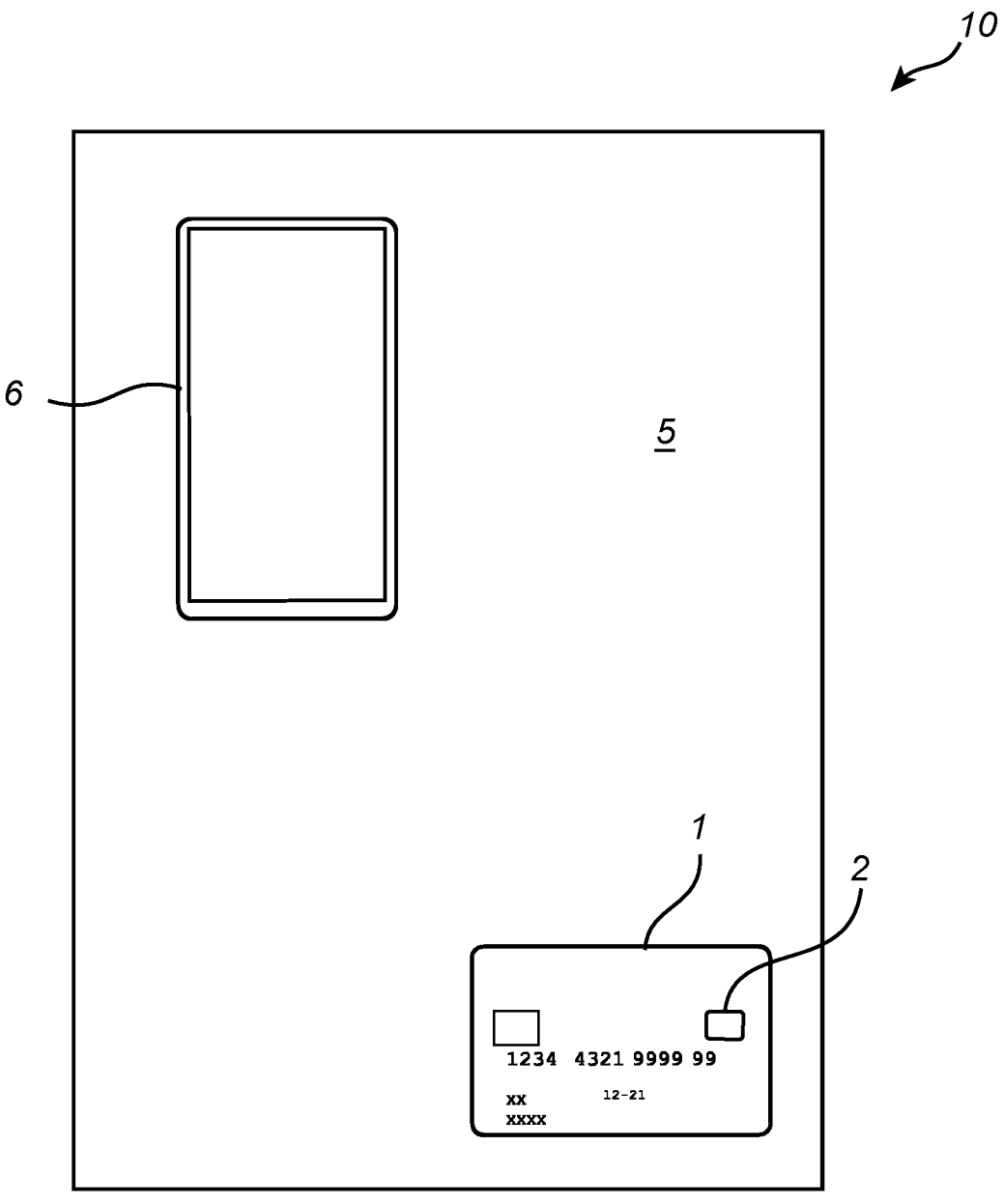
FIGS. 2a and 2b illustrate a frontside of an enrolment assistance device configured to facilitate biometric enrolment of a user of a contactless smartcard according to an embodiment.
Figure 2B:
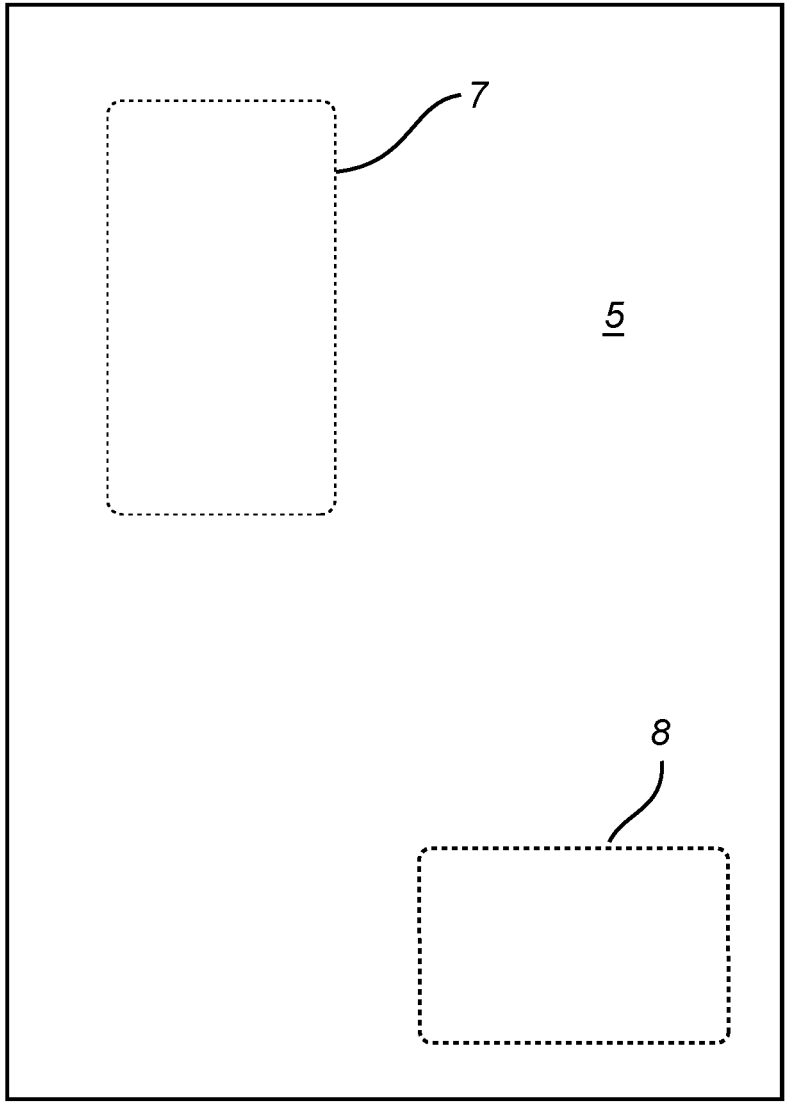

FIGS. 2a and 2b illustrate an enrolment assistance device 10 configured to facilitate biometric enrolment of a user of a contactless smartcard 1 according to an embodiment.

FIG. 2a illustrates a carrier 5 of the enrolment assistance device 10 accommodating the smartcard and a user device 6 in the form of a smart phone 6, while FIG. 2b illustrates the carrier 5 without the smartcard 1 and the user device 6, with a first surface portion 7 configured to receive the user device 6 and a second surface portion 8 spaced apart from the first surface portion 7 and configured to receive the smartcard 1.

Hence, an enrolment system may be provided comprising the enrolment assistance device 10, the user device 6 and the smartcard 1 according to an embodiment.

Typically, the contactless smartcard 1 is fixed to the second surface portion 8 of the carrier 5 of the enrollment assistance device 11 upon being delivered to the user. In appearance, the carrier 5 may be similar to the letter sent by an issuer of a smartcard to a user with the contactless smartcard 1 being fixed to the carrier 5 by a suitable adhesive or may be inserted in a sleeve arranged on the carrier 5. In an embodiment, the carrier 5 may be made of paper.

Figure 3:
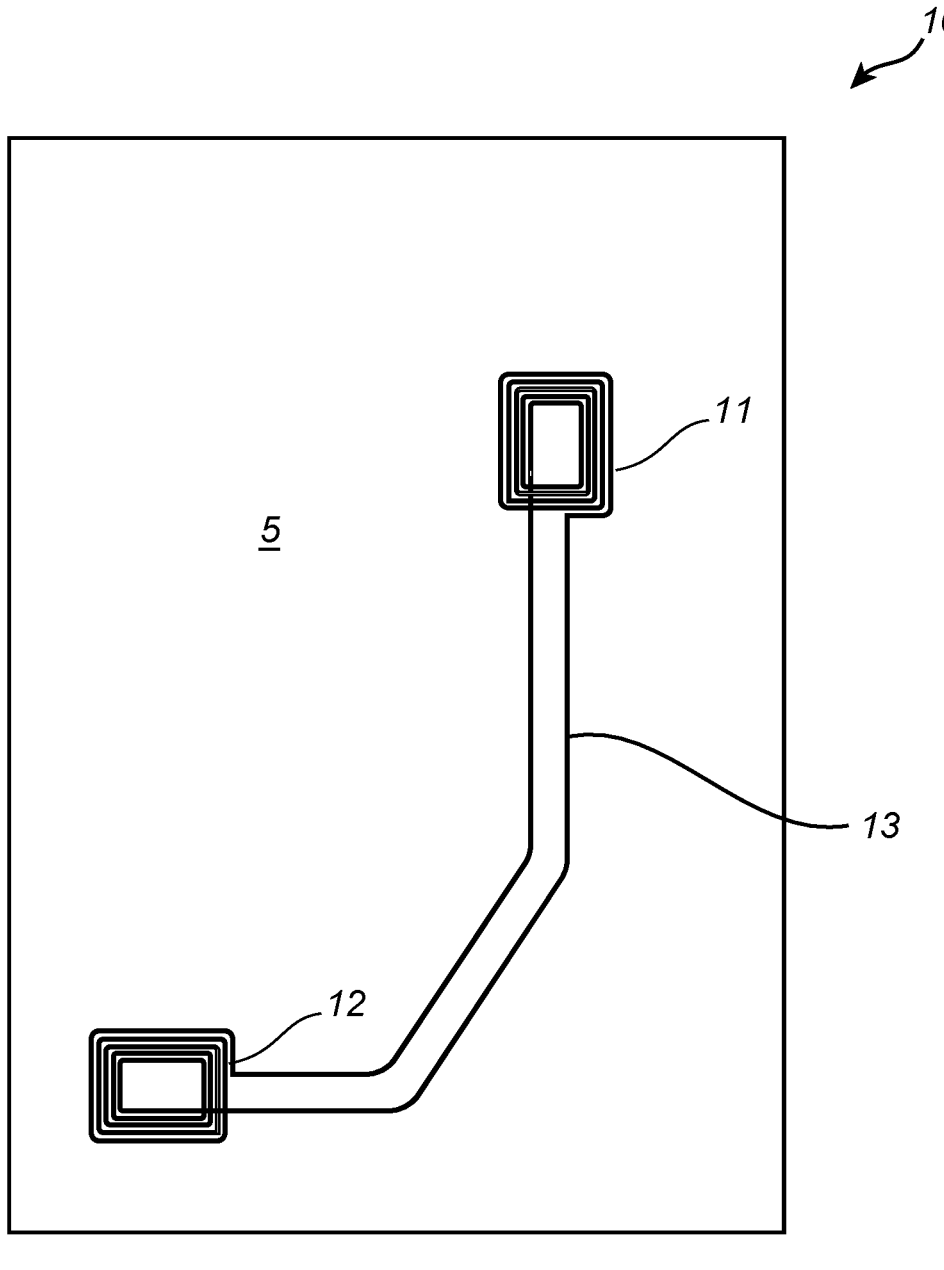
FIG. 3 illustrates a backside of the enrolment assistance device of FIGS. 2a and 2b.

While FIGS. 2a and 2b illustrate a frontside of the enrolment assistance device 10, FIG. 3 illustrates a backside of the enrolment assistance device 10.

Now, in order to enable powering of the smartcard 1 by utilizing the user device, the first surface portion 7 of the carrier 5 is arranged with a conductor 11, such as an antenna, configured to wirelessly harvest energy from a wireless power transfer arrangement (not shown) of the user device 6.

Thus, when the user device is placed on the first surface portion 7 of the carrier 5, the conductor of the first surface portion 7 harvests energy and transfers the harvested energy to a conductor 12 of the second first surface portion 8 via connector 13.

The conductor 12 of the second first surface portion 8 will hence wirelessly transfer the harvested energy to the wireless power transfer arrangement 3 of the smartcard 1 such that e.g. the fingerprint sensing module 2 may be powered for operation.

When the fingerprint sensing module 2 is appropriately powered, the user may place a finger on the module 2 and biometric data may be extracted by the smartcard 1. Typically, the user device 6 is only used for guiding the user through the enrolment process while the biometric data is held locally at the smartcard 1 for security reasons. However, it may be envisaged that the extracted biometric data is sent to the user device 6 for enrolment of the user, either wirelessly or via the second conductor 12, the connector 13 and the first conductor 11 to the user device 6. The user device 6 may in its turn securely send the biometric data to a central secure storage.

When a user performs a purchase e.g. at a point-of-sale (POS) terminal using her smartcard 1, the comparison of presented fingerprint data with the previously enrolled fingerprint is typically performed in the secure element 4 of the smartcard 1, If there is a match, the user is authenticated and the transaction is successful, even if it may be envisaged that the POS terminal securely transmits the extracted fingerprint data to the central secure storage for comparison with the enrolled fingerprint data. If there is a match at the central storage, the user is authenticated and the transaction is successful.

Again with reference to FIGS. 2a and 2b, even if the user device 6 is perfectly aligned with the first surface portion 7 of the carrier 5, it may happen that the wireless power transfer arrangement of the user device 6 is not well-aligned with the conductor 11 of the first surface portion 7.

The placement of the wireless power transfer arrangement inside the user device 6 may vary depending on brand and/or model of the user device 6; while one model may have the wireless power transfer arrangement placed in a centre location of the user device 6, another model may have the arrangement placed at an upper section of the user device 6, while a third model may have the arrangement placed at a lower section of the user device 6.

As a result, even if the user device 6 is perfectly aligned with the first surface portion 7 (indicated to the user by means of e.g. dotted lines is shown in FIG. 2b) of the carrier 5, it may be that due to the placement of the wireless power transfer arrangement inside the user device 6, the inductive coupling between the arrangement and the conductor 11 is poor and the amount of harvested energy will not be sufficient for powering the smartcard 1, and thus not sufficient for the user to enroll her fingerprint with the user device 6.

This is resolved in that the smartcard 1 is configured to signal to the user device 6 when the harvested energy provided to the smartcard 1 exceeds an energy threshold T indicating that the amount of harvested energy is sufficient to power the smartcard 1. Firmware on the smartcard 1 may be configured to correctly set the threshold T.

Figure 4:
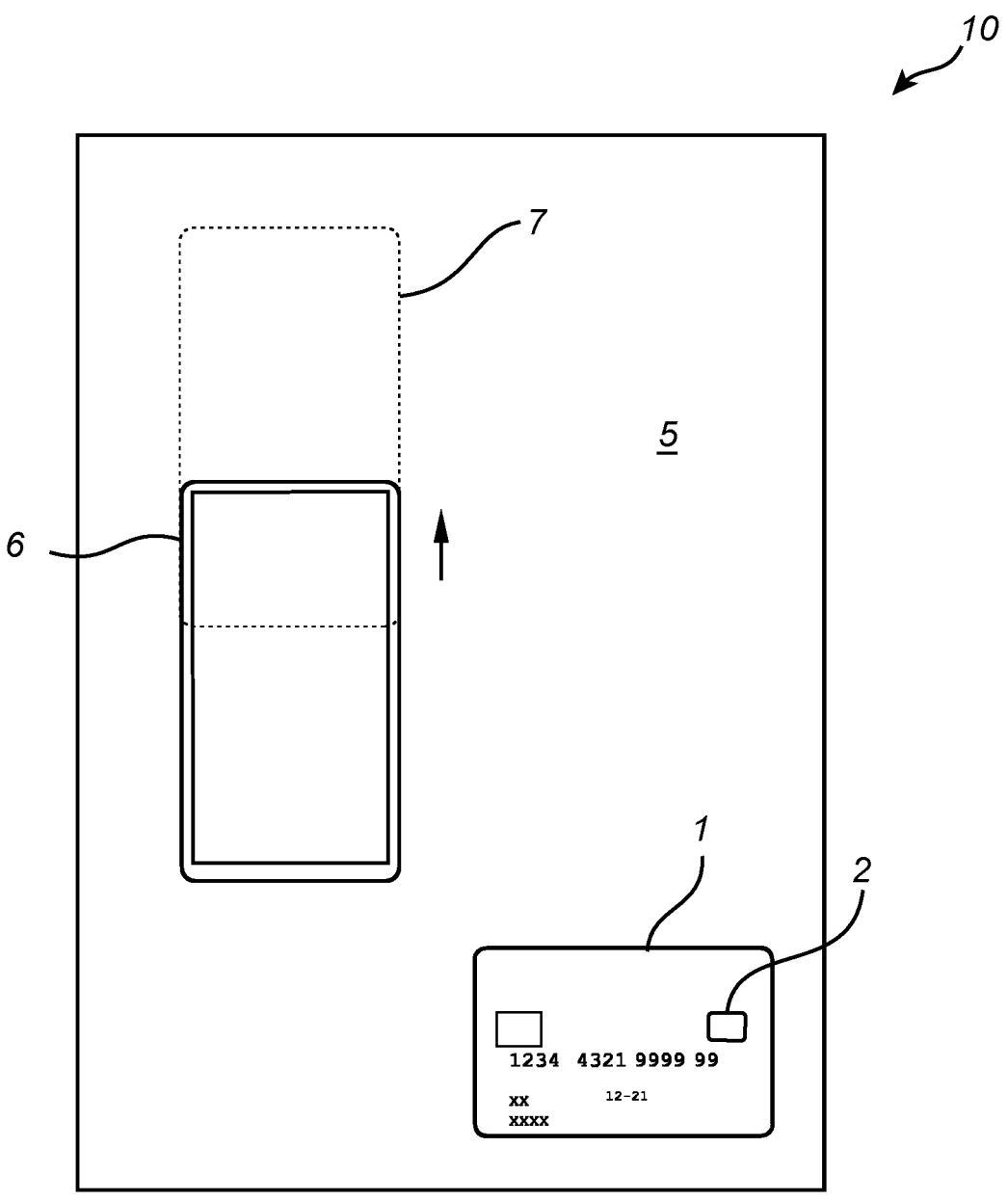
FIG. 4 illustrates movement of a user device into a desired position in a first surface portion of the enrolment assistance device according to an embodiment.

Hence, with reference to FIG. 4, as the user moves the user device 6 into a desired position in the first surface portion 7 (illustrated by the arrow), once the harvested energy of the conductor 11 of the first surface portion 7 being transferred via the connector 13 to the conductor 12 of the second surface portion 6 and further on to the smartcard 1 exceeds the energy threshold T as assessed by the smartcard 1, a signal is sent to the user device 6.

As is understood, this signal may be sent via from the smartcard 1 to the user device 6 via the connector 13 or wirelessly by means of near field communication (NFC) being established between the smartcard 1 and the user device 6.

The user device 6 will in response to the received signal provide an alert to the user that a desired position of the user device 6 in the first surface portion 7 has been arrived at. The user will thus advantageously leave the user device 6 at that position and enroll her fingerprint with the fingerprint sensor module 2 of the smartcard 1 as described hereinabove.

The alert may be provided e.g. visually via the display of the user device 6 and/or audibly by means of a speaker of the user device 6.

It should be noted that an area of the wireless power transfer arrangement of the user device 6 to be aligned with the first conductor 11 for reaching an optimal energy harvesting position may be as small as 15×15 mm.

In an embodiment, the sheet 5 may be arranged with a visual guiding symbol to instruct a user on how to move the user deice 5 into the correct position. With reference to FIG. 4, the sheet 5 may be arranged with the illustrated arrow to guide the user on how to move the user device 5 into position on the first surface portion 7. As is understood, such visual guiding symbols may be more or less elaborate.

Thus, to facilitate correct placement of the user device 6, the carrier 5 may be provided with at least one indicium (such as e.g. an arrow) for guiding the user to correctly position the user device 6 on the first surface portion 7 of the carrier 5 in relation to the first conductor 11.

Further, an enrollment app may be downloaded to the user device 6 to allow the user device 6 to guide the user to move the user device into an optimal energy harvesting position on the first surface portion 7 with respect to the first conductor 11.

Figure 5:
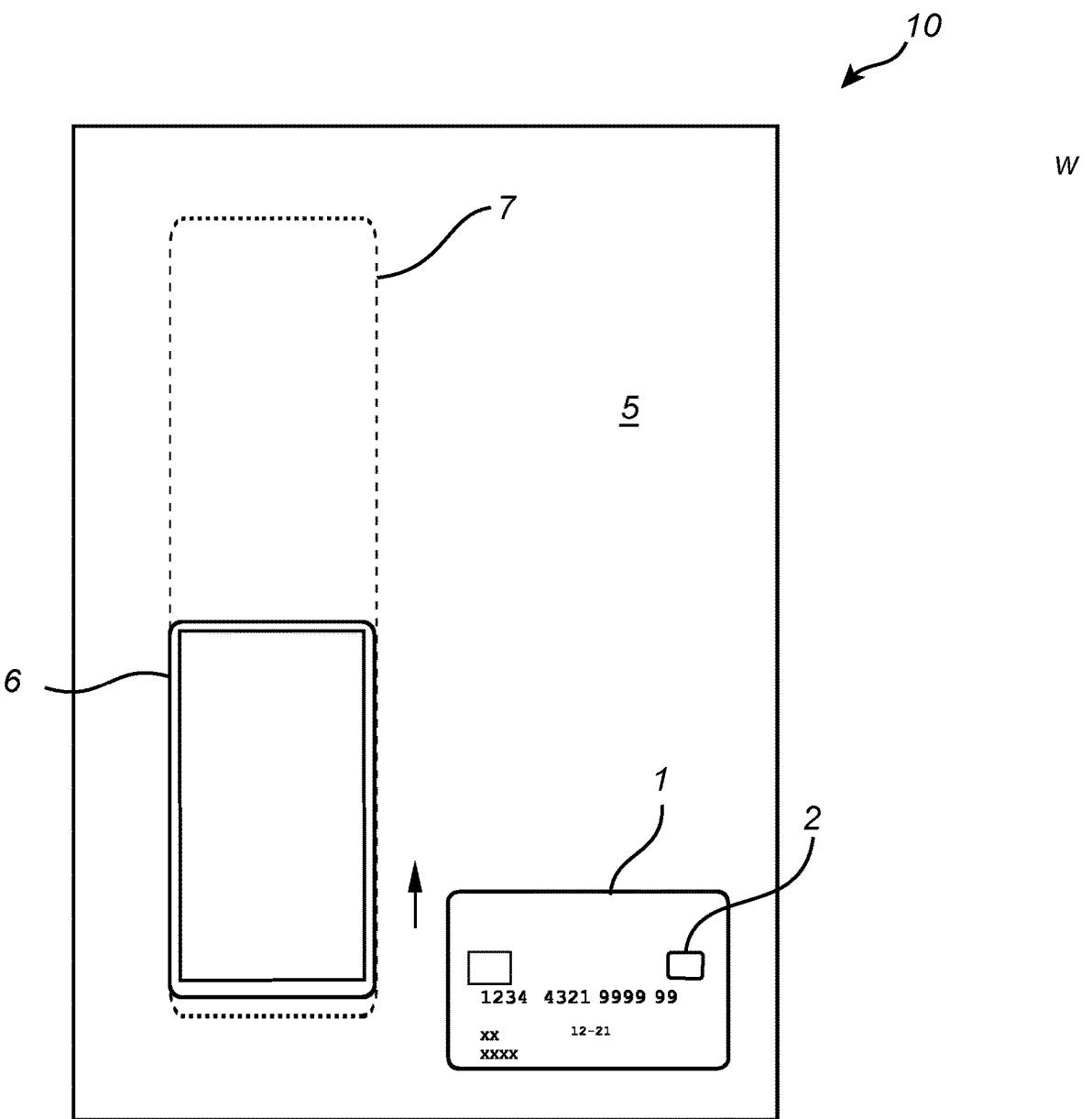
FIG. 5 illustrates movement of a user device into a desired position in a first surface portion of the enrolment assistance device having twice the length of the user device according to an embodiment.

FIG. 5 illustrates that a length of the first surface portion 7 may be about twice the length of the user device 6 with the first conductor 11 arranged at a center of the first surface portion 7, the rationale being that in case the power transfer arrangement of the user device 6 is arranged at a lower section of the user device 6, the user device 6 will be moved into the correct position with respect to the first conductor 11 without having the move the user device 11 beyond an upper end of the first surface portion 7.

In an embodiment, the enrollment assistance device 10 may be provided in the form of a sheet. In other words, the carrier 5 is provided in the form of a sheet with the conductor 11 of the first surface portion 7, the conductor 12 of the second surface portion 6 and the connector 13 provided on, or embedded in, the sheet. The sheet may at least partly be made of paper, or some other appropriate cellulose-based material.

Further, the conductive pattern forming the conductor 11 of the first surface portion 7, the conductor 12 of the second surface portion 6 and the connector 13 may be arranged on the surface of carrier 5, either the front side or the back side of the carrier 5. Alternatively, the conductive pattern may be embedded in the carrier 5. For instance, the carrier 5 may be a multi-layer structure.

While the power transfer between the user device 6 and the first conductor 11 and between the smartcard 1 and the second conductor 12 has been illustrated in the above as being effect by means of inductive coupling, other forms of wireless power transfer is envisaged such as capacitive power transfer.

Figure 6:
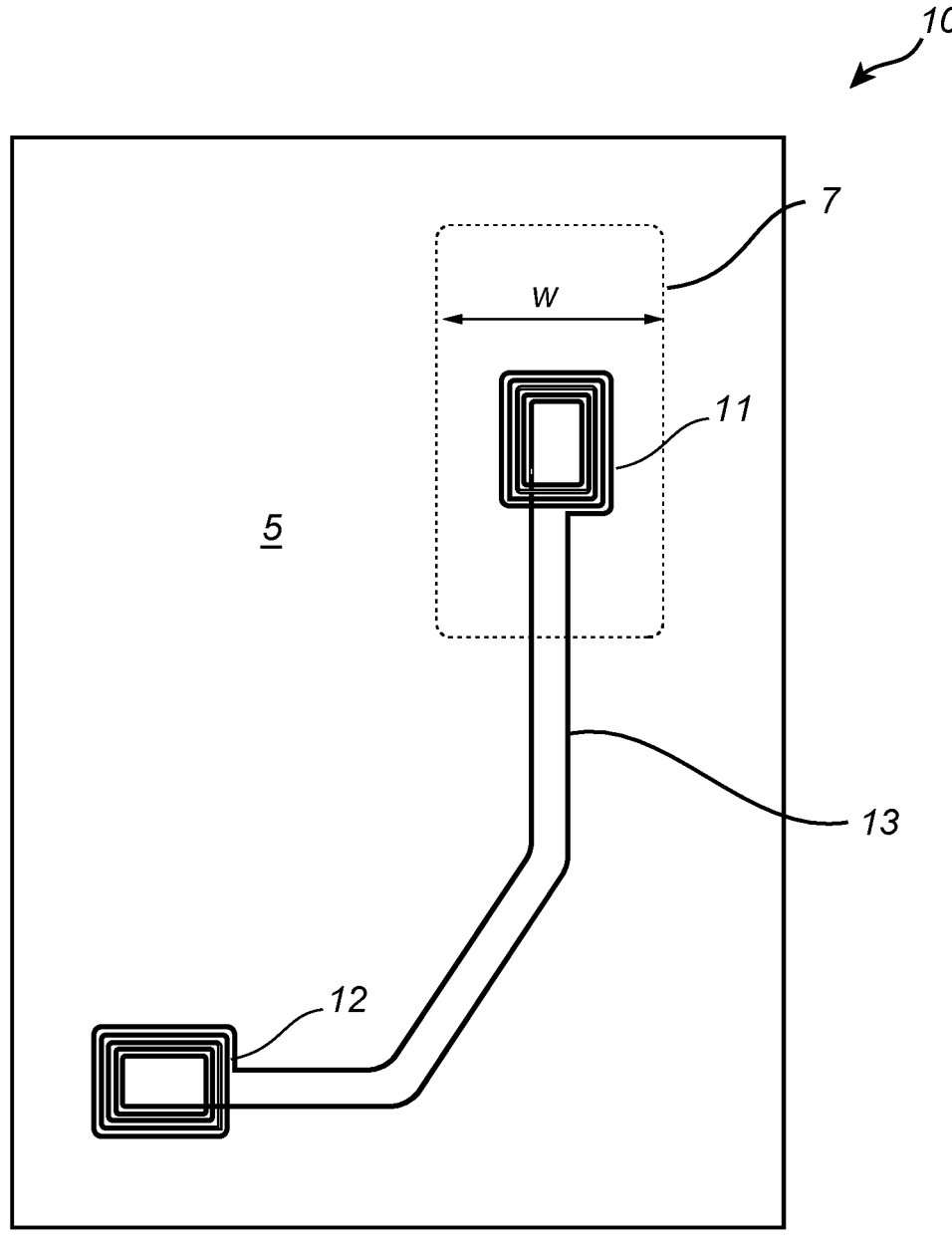
FIG. 6 illustrates a conductor of the first surface portion extending over a majority of a width of the first surface portion according to an embodiment.

FIG. 6 illustrates an embodiment where the first conductor 11 extends over a majority of a width w of the first surface portion 7. It may be envisaged that the first conductor 11 extends over the full width of the first surface portion 7 in order to advantageously increase the ability of the first conductor 11 to harvest energy from the wireless power transfer arrangement of the user device 6.

In a further embodiment, the first conductor 11 extends over a majority of a length of the first surface portion 7. It may be envisaged that the first conductor 11 extends over the full length of the first surface portion 7 in order to increase the ability of the first conductor 11 to harvest energy from the wireless power transfer arrangement of the user device 6.

In an embodiment, the signal causing the user device 6 to provide an alert to the user that a desired position of the user device 6 has been reached further causes the user device 6 to inform the user that enrolment of biometric data may be performed via the biometric sensor 2, for instance by informing the user via a display of the user device 6. For instance, if the wireless power transfer arrangement of the user device 6 is located at a lower right section of the user device 6, while the first conductor 11 is arranged at a centre of the first surface portion 7, the user device may e.g. via the display advantageously guide the user to align the lower right section of the user device 6 with the centre of the first surface portion 7 to find the optimal position for energy harvesting.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An enrolment assistance device configured to facilitate biometric enrolment of a user of a contactless smartcard comprising a biometric sensor and a wireless power transfer arrangement, the enrolment assistance device comprising:
   a carrier comprising:
      a first surface portion configured to receive a user device equipped with a wireless power transfer arrangement; and a second surface portion spaced apart from the first surface portion and configured to receive the contactless smartcard;
      the first surface portion being arranged with a conductor configured to wirelessly harvest energy from the wireless power transfer arrangement of the user device;
      the second surface portion being arranged with a conductor arranged to be connected to the conductor of the first surface portion via a connector and configured to wirelessly transfer the harvested energy to the wireless power transfer arrangement of the contactless smartcard; wherein
      the contactless smartcard is configured to transmit a signal to the user device upon the user device being moved into position by a user in the first surface portion enabling the contactless smartcard to harvest an amount of energy exceeding an energy threshold via the conductor of the second surface portion, the signal causing the user device to provide an alert to the user that a desired position of the user device has been reached, and
      the energy threshold corresponds to an amount of harvested energy sufficient to adequately power the contactless smartcard during biometric enrolment of the user.

2. The enrolment assistance device according to claim 1, wherein the carrier is provided in the form of a sheet.

3. The enrolment assistance device according to claim 1, wherein the carrier comprises at least one indicium for guiding the user to correctly arrange the user device on the first surface portion of the carrier, in relation to the wireless power transfer arrangement of the user device, in order to enable the contactless smartcard to harvest an amount of energy exceeding the energy threshold.

4. The enrolment assistance device according to claim 1, the conductor of the first surface portion being arranged to extend over a majority of a width of the first surface portion.

5. The enrolment assistance device according to claim 1, the conductor of the first surface portion being arranged to extend over a majority of a length of the first surface portion.

6. The enrolment assistance device according to claim 1, the contactless smartcard being arranged to be detachably attached to the second surface portion of the carrier of the enrolment assistance device.

7. The enrolment assistance device according to claim 1, wherein the signal causes the user device to provide a visual or audial alert to the user that a desired position of the user device has been reached.

8. The enrolment assistance device according to claim 1, the signal causing the user device to provide an alert to the user that a desired position of the user device has been reached further causing the user device to inform the user that enrolment of biometric data may be performed via the biometric sensor.

9. The enrolment assistance device according to claim 1, the biometric sensor comprising a fingerprint sensor.

10. A method of an enrolment assistance device of facilitating biometric enrolment of a user of a contactless smartcard comprising a biometric sensor and a wireless power transfer arrangement, the enrolment assistance device comprising:
   a carrier comprising:
      a first surface portion configured to receive a user device equipped with a wireless power transfer arrangement; and

a second surface portion paced apart from the first surface portion and configured to receive the contactless smartcard;

the first surface portion being arranged with a conductor configured to wirelessly harvest energy from the wireless power transfer arrangement of the user device;

the second surface portion being arranged with a conductor arranged to be connected to the conductor of the first surface portion via a connector and configured to wirelessly transfer the harvested energy to the wireless power transfer arrangement of the contactless smartcard; wherein the contactless smartcard is configured to transmit a signal to the user device upon the user device being moved into position by a user in the first surface portion enabling the contactless smartcard to harvest an amount of energy exceeding an energy threshold via the conductor of the second surface portion, the signal causing the user device to provide an alert to the user that a desired position of the user device has been reached, and the energy threshold corresponds to an amount of harvested energy sufficient to adequately power the contactless smartcard during biometric enrolment of the user.

11. The method according to claim 10, wherein the carrier comprises at least one indicium for guiding the user to correctly arrange the user device on the first surface portion of the carrier, in relation to the wireless power transfer arrangement of the user device, to enable the contactless smartcard to harvest an amount of energy exceeding the energy threshold.

12. The method according to claim 10, wherein the signal causes the user device to provide a visual or audial alert to the user that a desired position of the user device has been reached.

13. The method according to claim 10, wherein the signal causing the user device to provide an alert to the user that a desired position of the user device has been reached further causing the user device to inform the user that enrolment of biometric data may be performed via the biometric sensor.

14. The method according to claim 10, the user device being configured to guide the user to correctly arrange the user device on the first surface portion of the carrier, in relation to the wireless power transfer arrangement of the user device, to enable the contactless smartcard to harvest an amount of energy exceeding the energy threshold.

15. The method according to claim 14, the user device being configured to guide the user to correctly arrange the user device on the first surface portion of the carrier by providing audial or visual instructions to the user.

* * * * *